United States Patent [19]
Ishii et al.

[11] Patent Number: 6,012,352
[45] Date of Patent: Jan. 11, 2000

[54] SHIFTING DEVICE FOR AN AUTOMATIC TRANSMISSION

[75] Inventors: Shigeru Ishii, Atsugi; Masashi Sugiuchi, Hiratsuka; Mitsuru Fujioka, Fujisawa, all of Japan

[73] Assignee: Nissan Motor Co., Ltd., Yokohama, Japan

[21] Appl. No.: 09/122,890

[22] Filed: Jul. 28, 1998

[30] Foreign Application Priority Data

Jul. 29, 1997 [JP] Japan ................................ 9-203297

[51] Int. Cl.⁷ ........................ B60K 20/00; F16H 59/00; H01H 9/06
[52] U.S. Cl. ........................ 74/473.18; 74/335; 200/61.88
[58] Field of Search .................... 74/473.18, 335, 74/473.33; 200/61.88, 61.91

[56] References Cited

U.S. PATENT DOCUMENTS

| | | | |
|---|---|---|---|
| 3,628,642 | 12/1971 | Ravenel et al. | 192/73 |
| 4,987,792 | 1/1991 | Mueller . | |
| 5,009,128 | 4/1991 | Seidel et al. | 74/473.18 X |
| 5,090,269 | 2/1992 | Ohtsuka et al. | 74/861 |
| 5,357,820 | 10/1994 | Moroto et al. | 74/473.18 X |
| 5,415,056 | 5/1995 | Tabata et al. | 74/473.18 X |
| 5,425,686 | 6/1995 | Grange | 477/79 |
| 5,584,209 | 12/1996 | Issa | 74/335 |
| 5,675,315 | 10/1997 | Issa et al. | 200/61.88 X |
| 5,680,307 | 10/1997 | Issa et al. | 74/473.18 X |
| 5,682,789 | 11/1997 | DeCrouppe et al. | 74/473.18 X |
| 5,799,539 | 9/1998 | Haase | 74/473.18 |
| 5,847,344 | 12/1998 | Denyer et al. | 200/61.88 |
| 5,862,708 | 1/1999 | Shamoto | 74/473.18 |
| 5,899,115 | 5/1999 | Kataumi et al. | 74/473.18 |

FOREIGN PATENT DOCUMENTS 0 403 273   12/1990   European Pat. Off. .

*Primary Examiner*—Tamara L. Graysay
*Assistant Examiner*—Brandon C. Stallman
*Attorney, Agent, or Firm*—Foley & Lardner

[57] ABSTRACT

A shifting device for an automatic transmission of a vehicle has a manual shift mode which permits a driver to manually change a speed ratio by displacing a shift lever in an upshift direction or a downshift direction in a manual operation lane from its neutral position. The shifting device is provided with a switch for detecting that the shift lever has moved to the manual operation lane, a switch for detecting that the shift lever has moved in the upshift direction from its neutral position, and a switch for detecting that the shift lever has moved in the downshift direction from its neutral position. All these three switches comprise a traveling contact and two contacts. The traveling contacts of the three switches are earthed, and the six contacts of the three switches are respectively connected to six input terminals of a control unit. Due to this, the control unit can determine a fault in any of the switches based on the signals input into the input terminals.

1 Claim, 2 Drawing Sheets

SHIFTING DEVICE FOR AN AUTOMATIC TRANSMISSION

FIELD OF THE INVENTION

The present invention relates to a shifting device of an automatic transmission for a vehicle, and more specifically to a shifting device for an automatic transmission with a manual shift mode.

BACKGROUND OF THE INVENTION

In an automatic transmission for a vehicle, a speed ratio is automatically changed according to a vehicle speed and throttle opening. Some automatic transmissions comprise a manual shift mode so that a driver can change the speed ratio manually. A shifting device of such an automatic transmission is disclosed in U.S. Pat. No. 4,987,792.

When the driver intends to apply the manual shift mode, the driver moves a shift lever from a first shift lane to a second shift lane through a changeover lane. When the driver moves the shift lever in an upshift direction in the second shift lane, an upshift command is output to the transmission, and when the driver moves the shift lever in a downshift direction in the second shift lane, a downshift command is output to the transmission. Whether or not the shift lever has moved to the second shift lane, or whether or not the shift lever has moved in the upshift or downshift directions, is detected by plural switches provided in the changeover lane and second shift lane.

SUMMARY OF THE INVENTION

In the above conventional shifting device, however, even if there was a faulty switch which is frozen in a conducting state or non-conducting state, the shifting device could not determine whether or not it had a fault.

It is therefore an object of this invention to provide a shifting device for an automatic transmission with a manual shift mode which can determine whether any particular switch is faulty.

According to an aspect of this invention as described in claim 1, a shifting device for an automatic transmission comprises a shift lever for selecting an automatic shift mode and a manual shift mode and for selecting either of upshift and downshift operations when the manual shift mode is selected, a manual mode switch for detecting whether or not the shift lever has selected the manual shift mode, an upshift switch for detecting whether or not the shift lever has selected the upshift operation, a downshift switch for detecting whether or not the shift lever has selected the downshift operation, and a control unit for outputting a shifting command to the transmission based on input signals from the manual mode switch, upshift switch and downshift switch. The control unit comprises six input terminals from a first input terminal to a sixth input terminal. The manual mode switch comprises a first traveling contact, a first contact which comes in contact with the first traveling contact when the shift lever has not selected the manual shift mode, and a second contact which comes in contact with the first traveling contact when the shift lever has selected the manual shift mode. The upshift switch comprises a second traveling contact, a third contact which comes in contact with the second traveling contact when the shift lever has not selected the upshift operation, and a fourth contact which comes in contact with the second traveling contact when the shift lever has selected the upshift operation. The downshift switch comprises a third traveling contact, a fifth contact which comes in contact with the third traveling contact when the shift lever has not selected the downshift operation, and a sixth contact which comes in contact with the third traveling contact when the shift lever has selected the downshift operation. The traveling contacts of the manual mode switch, upshift switch and downshift are earthed, and the six contacts of the manual mode switch, upshift switch and downshift switch are respectively connected to said input terminals of the control unit.

Due to this, the control unit can determine a fault in a manual mode switch, upshift switch and downshift switch individually, based on signals input into six input terminals.

According to an aspect of the invention as described in claim 2, a shifting device for an automatic transmission comprises a shift lever for selecting an automatic shift mode and a manual shift mode and for selecting either of upshift and downshift operations when the manual shift mode is selected, a manual mode switch for detecting whether or not the shift lever has selected the manual shift mode, an upshift switch for detecting whether or not the shift lever has selected the upshift operation, a downshift switch for detecting whether or not the shift lever has selected the downshift operation, and a control unit for outputting a shifting command to the transmission based on input signals from said manual mode switch, upshift switch and downshift switch. The control unit comprises four input terminals from a first input terminal to a fourth input terminal, the manual mode switch comprises a first traveling contact, a first contact which comes in contact with the first traveling contact when the shift lever has not selected the manual shift mode, and a second contact which comes in contact with the first traveling contact when the shift lever has selected the manual shift mode. The upshift switch comprises a second traveling contact, a third contact which comes in contact with the second traveling contact when the shift lever has not selected the upshift operation, and a fourth contact which comes in contact with the second traveling contact when the shift lever has selected the upshift operation. The downshift switch comprises a third traveling contact, a fifth contact which comes in contact with the third traveling contact when the shift lever has not selected the downshift operation, and a sixth contact which comes in contact with the third traveling contact when the shift lever has selected the downshift operation. The first traveling contact of the manual mode switch is earthed, the first contact of the manual mode switch is connected to the first input terminal of the control unit, the second traveling contact of the upshift switch is connected to the second contact of the manual mode switch. The third contact of the upshift switch is connected to the third traveling contact of the downshift switch. The fourth contact of the upshift switch is connected to the second input terminal of the control unit. The fifth contact and sixth contact of the downshift switch are respectively connected to the third input terminal and the fourth input terminal of the control unit.

Due to this, the control unit can determine a fault in the manual mode switch, upshift switch and downshift switch individually, based on signals input into four input terminals. Also, when the manual shift mode is not selected, the second contact of the manual mode switch becomes non-conducting to the first traveling contact of the manual mode switch, so a malfunction of the shifting device can be prevented even if the upshift switch or downshift switch has a fault.

According to an aspect of the invention as described in claim 3, a shifting device for an automatic transmission comprises a shift lever for selecting an automatic shift mode and a manual shift mode and for selecting either of upshift and downshift operations when the manual shift mode is selected, a manual mode switch for detecting whether or not the shift lever has selected the manual shift mode, an upshift switch for detecting whether or not the shift lever has selected the upshift operation, a downshift switch for detecting whether or not the shift lever has selected the downshift operation, and a control unit for outputting a shifting command to the transmission based on input signals from said manual mode switch, upshift switch and downshift switch. The control unit comprises four input terminals from a first input terminal to a fourth input terminal, the manual mode switch comprises a first traveling contact, a first contact which comes in contact with the first traveling contact when the shift lever has not selected the manual shift mode, and a second contact which comes in contact with the first traveling contact when the shift lever has selected the manual shift mode. The upshift switch comprises a second traveling contact, a third contact which comes in contact with the second traveling contact when the shift lever has not selected the upshift operation, and a fourth contact which comes in contact with the second traveling contact when the shift lever has selected the upshift operation. The downshift switch comprises a third traveling contact, a fifth contact which comes in contact with the third traveling contact when the shift lever has not selected the downshift operation, and a sixth contact which comes in contact with the third traveling contact when the shift lever has selected the downshift operation. The first traveling contact of the manual mode switch is earthed, the first contact of the manual mode switch is connected to the first input terminal of the control unit, the third traveling contact of the downshift switch is connected to the second contact of the manual mode switch. The fifth contact of the downshift switch is connected to the second traveling contact of the upshift switch. The sixth contact of the downshift switch is connected to the second input terminal of the control unit. The third contact and fourth contact of the upshift switch are respectively connected to the third input terminal and the fourth input terminal of the control unit. Due to this, the same effect is obtained as the invention described in claim 2.

The details as well as other features and advantages of this invention are set forth in the remainder of the specification and are shown in the accompanying drawings.

DESCRIPTION OF THE PREFERRED EMBODIMENTS

Figure 1:
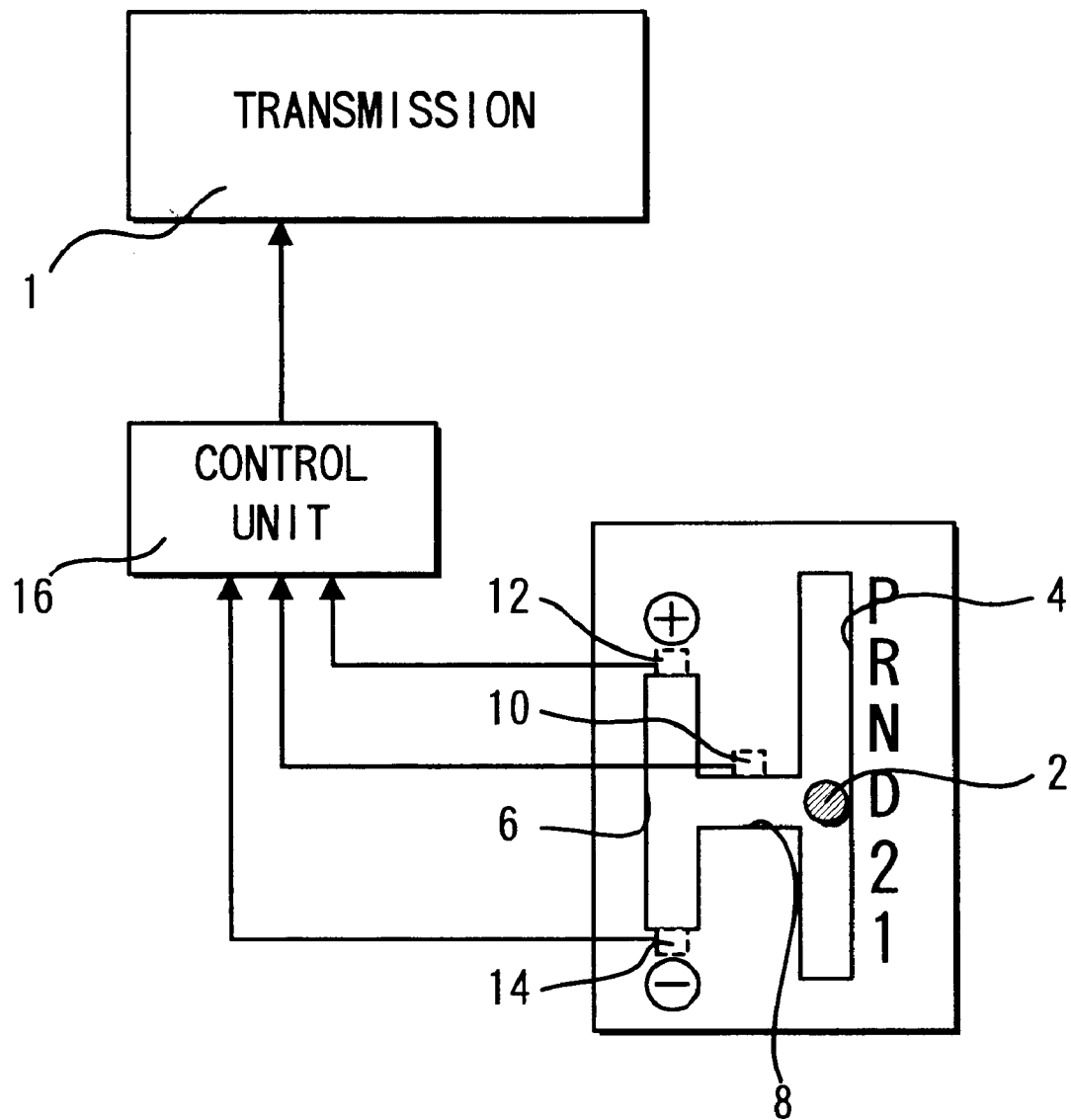
FIG. 1 is a schematic diagram of a transmission control system comprising a shifting device according to this invention.

Referring to FIG. 1 of the drawings, a shifting device of an automatic transmission 1 is provided with a shift lever 2, a selector lane 4, a manual operation lane 6, a changeover lane 8 connecting therebetween, and a control unit 16.

In the selector lane 4, the shift lever 2 is placed in any of six positions, i.e. a parking range "P", reverse range "R", neutral range "N", drive range "D", second range "2" and first range "1" which are arranged in one line in the lane in sequence in the front-rear direction of the vehicle.

The manual operation lane 6 is provided in parallel with the selector lane 4 centered on a position corresponding to the aforesaid drive range "D". In the manual operation lane, the shift lever is maintained at its neutral position, and according to an operation by the driver, it is moved in an upshift (+) direction or downshift (−) direction.

The changeover lane 8 connects the selector lane 4 and manual operation lane 6 at a position corresponding to drive range "D". The shift lever 2 displaces between the selector lane 4 and manual operation lane 6 via the changeover lane 8.

When the shift lever 2 is displaced from the drive range "D" of the selector lane 4 to the manual operation lane 6 via the changeover lane 8, the shifting device enters the manual shift mode. In the manual shift mode, when the driver displaces the shift lever 2 in the upshift direction in the manual operation lane 6, the automatic transmission 1 shifts up to the next higher gear, and when the driver displaces the shift lever 2 in the downshift direction in the manual operation lane 6, the automatic transmission 1 shifts down to the next lower gear.

In the changeover lane 8, a manual mode switch 10 is provided to detect whether or not the shift lever 2 has moved to the manual operation lane 6. In the manual operation lane 6, an upshift switch 12 to detect whether the shift lever 2 is in the upshift portion of the lane, and a downshift switch 14 to detect whether the shift lever 2 is in the downshift portion of the lane, are provided. In the selector lane 4, an inhibitor switch, not shown, for detecting whether the shift lever 2 is in the "P", "R", "N", "D", "2" or "1" range, is provided.

Figure 2:
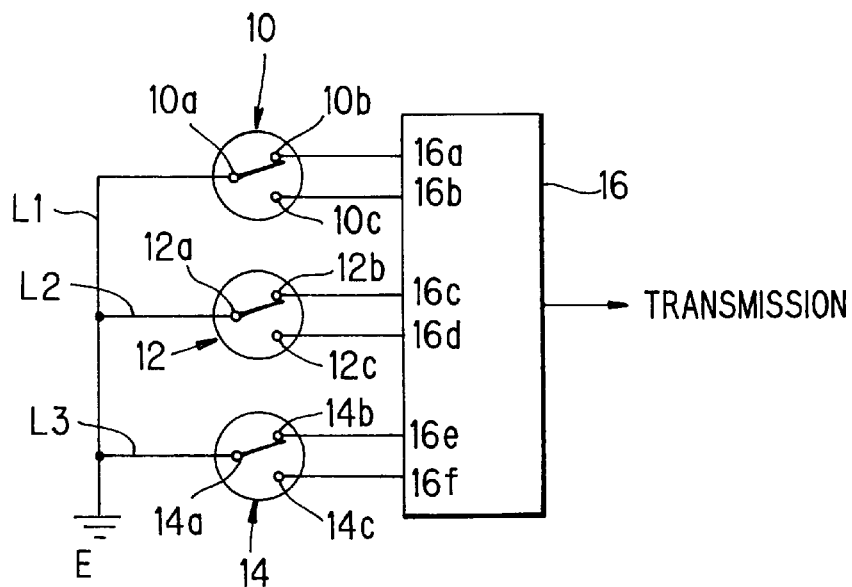
FIG. 2 is a circuit diagram of the shifting device.

FIG. 2 is a circuit diagram of the shifting device.

The shifting device is provided with the manual mode switch 10, upshift switch 12, downshift switch 14 and control unit 16. The control unit 16 comprises six input terminals from a first input terminal 16a to a sixth input terminal 16f. These three switches 10, 12, 14 are switches connected in parallel to the control unit 16.

The manual mode switch 10 is provided with a first traveling contact 10a, a first contact 10b and a second contact 10c. The first traveling contact 10a is connected to a first earthed line L1. The first contact 10b is connected to the first input terminal 16a of the control unit 16 and the second contact 10c is connected to the second input terminal 16b of the control unit 16. When the shift lever 2 is in the selector lane 4, the first contact 10b comes in contact with the first traveling contact 10a, and when the shift lever 2 is in the manual operation lane 6, the second contact 10c comes in contact with the first traveling contact 10a.

The upshift switch 12 comprises a second traveling contact 12a, a third contact 12b and a fourth contact 12c. The second traveling contact 12a is connected to a second earthed line L2. The third contact 12b is connected to the third input terminal 16c of the control unit 16 and the fourth contact 12c is connected to the fourth input terminal 16d of the control unit 16. When the shift lever 2 is in the upshift portion of the manual operation lane 6, the fourth contact 12c comes in contact with the second traveling contact 12a, and when the shift lever 2 is not in the upshift portion, the third contact 12b comes in contact with the second traveling contact 12a.

The downshift switch 14 comprises a third traveling contact 14a, a fifth contact 14b and a sixth contact 14c. The third traveling contact 14a is connected to a third earthed line L3. The fifth contact 14b is connected to the fifth input terminal 16e of the control unit 16 and the sixth contact 14c is connected to the sixth input terminal 16f of the control unit 16. When the shift lever 2 is in the downshift portion of the manual operation lane 6, the sixth contact 14c comes in contact with the third traveling contact 14a, and when the shift lever 2 is not in the downshift portion, the fifth contact 14b comes in contact with the third traveling contact 14a.

Now referring to Table 1 below, the operation of this control circuit will be described.

TABLE 1

| Shift lever position | States of signals to input terminals | | | | | |
|---|---|---|---|---|---|---|
| | 16a | 16b | 16c | 16d | 16e | 16f |
| (1) Selector lane | ON | OFF | ON | OFF | ON | OFF |
| (2) Manual operation lane | OFF | ON | ON | OFF | ON | OFF |
| (3) Upshift operation | OFF | ON | OFF | ON | ON | OFF |
| (4) Downshift operation | OFF | ON | ON | OFF | OFF | ON |

When the shift lever 2 is in the selector lane 4, as shown in (1) of Table 1, an ON signal is input into the first input terminal 16a, the third input terminal 16c and the fifth input terminal 16e of the control unit 16.

When the shift lever 2 displaces from the selector lane 4 to the manual operation lane 6 via the changeover lane 8, an ON signal is input into the second input terminal 16b, the third input terminal 16c and the fifth input terminal 16e of the control unit 16 as shown in (2) of Table 1.

Herein, when the shift lever 2 is moved in the upshift direction from its neutral position, an ON signal is input into the second input terminal 16b, the fourth input terminal 16d and the fifth input terminal 16e of the control unit 16 as shown in (3) of Table 1. When the shift lever 2 is moved in the downshift direction from its neutral position, an ON signal is input into the second input terminal 16b, the third input terminal 16c and the sixth input terminal 16f of the control unit 16 as shown in (4) of Table 1.

In this way, an ON signal is input into a predetermined input terminal of the control unit 16 according to the position of the shift lever 2.

Further, the control unit 16 can determine a fault in the manual mode switch 10, upshift switch 12 or downshift switch 14 based on the signals input into the input terminals 16a–16f.

For example, when OFF signals are input into the first input terminal 16a and the second input terminal 16b in succession for a predetermined time, the control unit 16 can determine that there is a break in the manual switch 10.

Also, if ON signals are input into the first input terminal 16a and the second input terminal 16b, the control unit 16 can determine that the first contact 10b of the manual mode switch 10 is short-circuiting to earth.

In this way, the control unit 16 can determine a fault in the manual mode switch 10 based on the signals input into the first and second input terminals 16a, 16b.

Similarly, the control unit 16 can determine a fault in the upshift switch 12 based on signals input into the third and fourth input terminals 16c, 16d. Further, the control unit 16 can determine a fault in the downshift switch 14 based on signals input into the fifth and sixth input terminals 16e, 16f.

Hence, the control unit 16 can determine a fault in the manual mode switch 10, upshift switch 12 or downshift switch 14 based on signals input into the input terminals 16a–16f.

Figure 3:
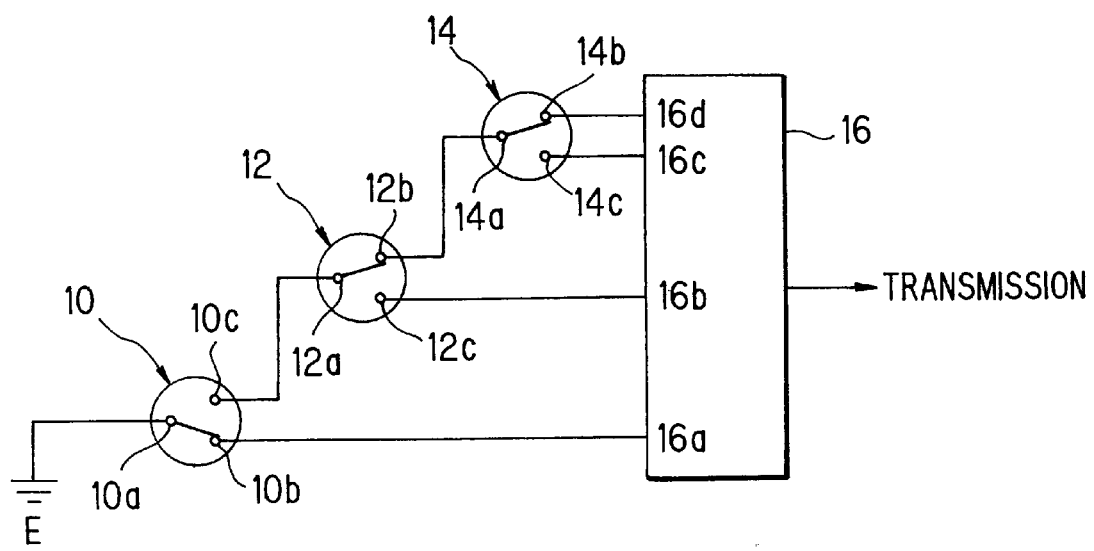
FIG. 3 is a circuit diagram showing a second embodiment of this invention.

FIG. 3 shows another embodiment of this invention.

The construction of the transmission control system is the same as that of the former embodiment, but the control circuit of the shifting device is different. In this embodiment, the manual mode switch 10, upshift switch 12 and downshift switch 14 are connected in series, and the control unit 16 is provided with four input terminals from a first input terminal 16a to a fourth input terminal 16d.

In the manual mode switch 10, the first traveling contact 10a is earthed, the first contact 10b is connected to the first input terminal 16a of the control unit 16, and the second contact 10c is connected to the second traveling contact 12a of the upshift switch 12. When the shift lever 2 is in the selector lane 4, the first contact 10b comes in contact with the first traveling contact 10a, and when the shift lever 2 is in the manual operation lane 6, the second contact 10c comes in contact with the first traveling contact 10a.

In the upshift switch 12, the fourth contact 12c is connected to the second input terminal 16b of the control unit 16, and the third contact 12b is connected to the third traveling contact 14a of the downshift switch 14. When the shift lever 2 is moved in the upshift direction from its neutral position, the fourth contact 12c comes in contact with the second traveling contact 12a, and when it is not, the third contact 12b comes in contact with the second traveling contact 12a.

In the downshift switch 14, the sixth contact 14c is connected to the third input terminal 16c of the control unit 16, and the fifth contact 14b is connected to the fourth input terminal 16d of the control unit 16. When the shift lever 2 is moved in the downshift direction from its neutral position, the sixth contact 14c comes in contact with the traveling contact 14a, and when it is not, the fifth contact 14b comes in contact with the traveling contact 14a.

Table 2 shows the operation of this control circuit.

TABLE 2

| Shift lever position | States of signals to input terminals | | | |
|---|---|---|---|---|
| | 16a | 16b | 16c | 16d |
| (1) Selector lane | ON | OFF | OFF | OFF |
| (2) Manual operation lane | OFF | OFF | OFF | ON |
| (3) Upshift operation | OFF | ON | OFF | OFF |
| (4) Downshift operation | OFF | OFF | ON | OFF |

When the shift lever 2 is in the selector lane 4, an ON signal is input into the first input terminal 16a of the control unit 16 as shown in (1) of Table 2.

When the shift lever 2 displaces from the selector lane 4 to the manual operation lane 6 via the changeover lane 8, an ON signal is input into the fourth input terminal 16d of the control unit 16 as shown in (2) of Table 2.

Further, when the shift lever 2 is moved in the upshift direction from its neutral position in the manual operation lane 6, an ON signal is input into the second input terminal 16b of the control unit 16 as shown in (3) of Table 2. When the shift lever 2 is moved in the downshift direction from its neutral position, an ON signal is input into the third input terminal 16c of the control unit 16 as shown in (4) of Table 2.

In this way, an ON signal is input into the predetermined input terminal of the control unit 16 according to the position of the shift lever 2.

Also, the control unit 16 can determine a fault in the manual mode switch 10, upshift switch 12 and downshift switch 14 based on a signal input into the input terminals 16a to 16d.

For example, when an OFF signal is input into the first input terminal 16a and the fourth input terminal 16d in succession for a predetermined time, the control unit 16 can determine that there is a break in the manual mode switch 10.

When an ON signal is input into the first input terminal 16a and the second input terminal 16b, the control unit 16 can determine that the fourth contact 12c of the upshift switch 12 is shorted to earth. Similarly, it can be determined that there is a fault in the downshift switch 14.

Therefore, the control unit 16 can determine a fault in the manual mode switch 10, upshift switch 12 and downshift switch 14 based on the signals input into the input terminals 16a to 16d.

Further, when the shift lever 2 is not in the manual operation lane 6, the second contact 10c of the manual mode switch 10 becomes non-conducting to the first traveling contact 10a, so an ON signal is not input into the input terminals 16b to 16d. In this way, misoperation of the shifting device can be prevented even if there is a fault in the upshift switch or downshift switch.

In the embodiment of FIG. 3, three switches were connected in the sequence manual mode switch 10, upshift switch 12, downshift switch 14, but the same effect is obtained if the upshift switch 14 and downshift switch 12 are interchanged, and connected in the sequence manual mode switch 10, downshift switch 14, upshift switch 12.

The contents of Japanese Application No. 9-203297, with a filing date Jul. 29, 1997 in Japan, are hereby incorporated by reference.

The embodiments of this invention in which an exclusive property or privilege is claimed are defined as follows:

1. A shifting device for an automatic transmission comprising:

a shift lever for selecting an automatic shift mode and a manual shift mode and for selecting either of upshift and downshift operations when said manual shift mode is selected, a manual mode switch for detecting whether or not said shift lever has selected said manual shift mode, said manual mode switch comprising a first traveling contact, a first contact which comes in contact with said first traveling contact when said shift lever has not selected said manual shift mode, and a second contact which comes in contact with said first traveling contact when said shift lever has selected said manual shift mode, an upshift switch for detecting whether or not said shift lever has selected said upshift operation, said upshift switch comprising a second traveling contact, a third contact which comes in contact with said second traveling contact when said shift lever has not selected said upshift operation, and a fourth contact which comes in contact with said second traveling contact when said shift lever has selected said upshift operation, a downshift switch for detecting whether or not said shift lever has selected said downshift operation, said down shift switch comprising a third traveling contact, a fifth contact which comes in contact with said third traveling contact when said shift lever has not selected said downshift operation, and a sixth contact which comes in contact with said third traveling contact when said shift lever has selected said downshift operation, and a control unit which comprising six input terminals from a first input terminal to a sixth input terminal for outputting a shifting command to said transmission based on input signals inputted into said six terminals from said manual mode switch, upshift switch and downshift switch, wherein said traveling contacts of said manual mode switch, upshift switch and downshift are earthed, and said six contacts of said manual mode switch, upshift switch and downshift switch are respectively connected to said six input terminals of said control unit.

* * * * *